United States Patent [19]
Bourekas et al.

[11] Patent Number: 5,694,567
[45] Date of Patent: Dec. 2, 1997

[54] DIRECT-MAPPED CACHE WITH CACHE LOCKING ALLOWING EXPANDED CONTIGUOUS MEMORY STORAGE BY SWAPPING ONE OR MORE TAG BITS WITH ONE OR MORE INDEX BITS

[75] Inventors: Philip A. Bourekas, San Jose; Andrew P. Ng, Mountain View, both of Calif.

[73] Assignee: Integrated Device Technology, Inc., Santa Clara, Calif.

[21] Appl. No.: 386,025

[22] Filed: Feb. 9, 1995

[51] Int. Cl.⁶ .................................................. G06F 12/00
[52] U.S. Cl. ................................... 395/403; 395/412
[58] Field of Search .............................. 395/403, 490, 395/412–421.1

[56] References Cited

U.S. PATENT DOCUMENTS 5,025,366  6/1991  Baror ............................. 395/455
5,353,425  10/1994  Malamy et al. ................ 395/471
5,367,653  11/1994  Coyle et al. ................... 395/455
5,390,308  2/1995  Ware et al. .................... 395/405
5,479,627  12/1995  Khalidi et al. ................. 395/415
5,487,162  1/1996  Tanaka et al. ................. 395/472
5,493,667  2/1996  Huck et al. .................... 395/452

*Primary Examiner*—Jack A. Lane
*Assistant Examiner*—Kevin Verbrugge
*Attorney, Agent, or Firm*—Skjerven, Morrill, MacPherson, Franklin, & Friel

[57] ABSTRACT

A direct mapped cache with cache locking according to one embodiment of the present invention includes a physical address latch and a multiplexing means. The multiplexing means receives the physical address from the physical address latch and exchanges a physical address tag bit with a physical address index bit to generate a cache tag address and a cache index address to divide the cache into two halves, each half servicing a contiguous address range of main memory.

20 Claims, 7 Drawing Sheets

DIRECT-MAPPED CACHE WITH CACHE LOCKING ALLOWING EXPANDED CONTIGUOUS MEMORY STORAGE BY SWAPPING ONE OR MORE TAG BITS WITH ONE OR MORE INDEX BITS

FIELD OF THE INVENTION

This invention is related to cache memories and, particularly, to direct mapped cache memories with cache locking.

BACKGROUND INFORMATION

Cache memories are used to decrease the average memory access time in many microprocessor systems. Cache memories typically are smaller and faster (i.e., lower access time) than main memory, and are used to store frequently used information (hereinafter called a "data word"). The CPU first searches the cache for the address of the requested data word and, if present, retrieves the data word stored at that address. However, when the CPU requests a data word that is not in the cache, the CPU accesses main memory and stores the data word in the cache. Oftentimes, storing information in the cache requires that an equal amount of information already stored in the cache be deleted.

Two of the main types of cache memories are set associative caches and direct mapped caches. In both types of caches, the address requested by the CPU is divided into a tag and index, with the tag typically comprising the higher order bits and the index comprising the lower order bits.

In a direct mapped cache, the cache is accessed by index (i.e., the index serves as an "address" where the data word and its tag is stored in the cache memory). Thus, the CPU sends the address of the requested data word to the cache. The index is used to access the cache and the data word and tag stored at the index is read. The stored tag is compared to the tag of the requested data word and, if they match, the data word is sent to and used by the CPU. Thus, in a direct mapped cache, an address in main memory can be mapped to only one particular cache location.

In contrast to direct mapped caches, set associative caches have at least two "sets" of possible stored information (i.e., data word and tag) for each index. The sets are distinguished from each other by tag. When the CPU requests an address be accessed, the requested address's index is used to access all of the sets associated with that index, and the requested address's tag is compared to each set's tag until a match is found (as in an associative memory, hence the name "set associative"). If a match occurs, the data word associated with the matched tag is sent to and used by the CPU. Thus, in a set associative cache, an address in main memory can be mapped into as many locations in the cache as there are sets.

CACHE LOCKING

In some applications, the tags of critical data words are stored in the cache and "locked" to prevent them from being deleted so that the data word can always be accessed as quickly as possible. Thus, other data words having the same index (but different tags) as locked data words cannot force deletion of "locked" data from the cache during normal cache miss refill processing.

Cache locking is difficult to implement in a conventional direct mapped cache. For example, FIG. 1 shows a memory mapping of a 16 word main memory and an 8 word direct mapped cache memory. A 16 word memory requires a 4 bit address, which in this example, is divided into a 1 bit tag and a 3 bit index. In this mapping, physical address ranges 0000–0011 and 1000–1011 map into cache index range 000–011, whereas physical address ranges 0100–0111 and 1100–1111 map into cache index range 100–111.

In this example, the indexes 000–011 are locked to keep a critical 4 word program stored at physical address range 0000–0011 (word 0–word 3) in the cache at all times. Thus, word 0–word 3 are stored in the cache at cache index range 000–011. Consequently, the programs stored at physical address range 1000–1011 (i.e., word 8–word 11) cannot be cached, while the information stored at physical address ranges 0100–0111 and 1100–1111 can be cached. As a result, an eight word program would have to be broken down into two discontiguous 4 word sections and stored at 0100–0111 and 1100–1111 in order to be completely "cacheable".

Extending the concept of the 8 word cache system described above to a 4 kB direct mapped cache system, if half of the cache were locked, then in effect, this system has a 2 kB cache that services the lower 2 kB of every 4 kB of main memory. The code in the upper 2 kB could not be cached. Consequently, a user would have to store a large program in discontiguous 2 kB pieces by using the lower half of each 4 kB block to ensure that the program can be serviced by the cache. Because typical software is very much larger than 2 kB, it is difficult to use cache locking in a direct mapped cache.

One solution to this problem is to modify the software compiler to store the unlocked software in the small portions that can be serviced by the cache. This solution typically requires the addition of complex page management software to the compiler's linker facility.

Another solution to this problem is to use a translation lookaside buffer (TLB) in applications where the cache size is equal to or larger than the virtual page size mapped by a single TLB entry. TLBs can mitigate the problems of cache locking in a direct mapped cache, but at the cost of additional hardware complexity and performance degradation. TLBs also require additional operating system software to maintain page tables to perform the translations.

Consequently, cache locking is commonly implemented in set associative caches. An extra bit is added to the cache memory for storing a lock bit for each tag in each set. Thus, when a set is locked, other sets associated with the locked set's index are available to cache other addresses with the same index, thereby avoiding the shortcomings of cache locking in a direct mapped cache.

However, set associative caches are more complex and costly than direct mapped caches because each set requires sense amplifiers and tag comparators. In addition, for locking caches, the lock bit for each tag increases the size of the cache. Further, the lock bit requires extra sense amplifiers and comparators for each set. Further still, each index may require a "tag set index bit" for each tag for each set.

SUMMARY

A direct mapped cache with cache locking according to one embodiment of the present invention includes a physical address latch and a multiplexing circuit. The multiplexing circuit receives the physical address from the physical address latch and exchanges a physical address tag bit with a physical address index bit to generate a cache tag address and a cache index address. The physical address tag bit and the physical address index bit are exchanged so that the direct mapped cache memory is divided into two equal halves, each half servicing a contiguous address range of main memory. The cache index and cache tag with "swapped" bits are used to access the memory cells in the cache memory as in a typical direct mapped cache.

A programmer can store critical software in one of the contiguous portions of main memory and lock it into one half of the cache. The programmer can then store other software in the other contiguous portion of main memory, which is serviced by the other half of the cache. Thus, a direct mapped cache with cache locking is realized without a TLB or additional page management or operating system software.

In another embodiment, the multiplexing circuit can exchange two physical address tag bits with two physical address index bits to generate a cache tag address and a cache index address. The physical address tag bit and the physical address index bit are exchanged so that the direct mapped cache memory is divided into four equal portions, each portion of the cache memory servicing a contiguous portion of main memory.

DETAILED DESCRIPTION

Figure 2:
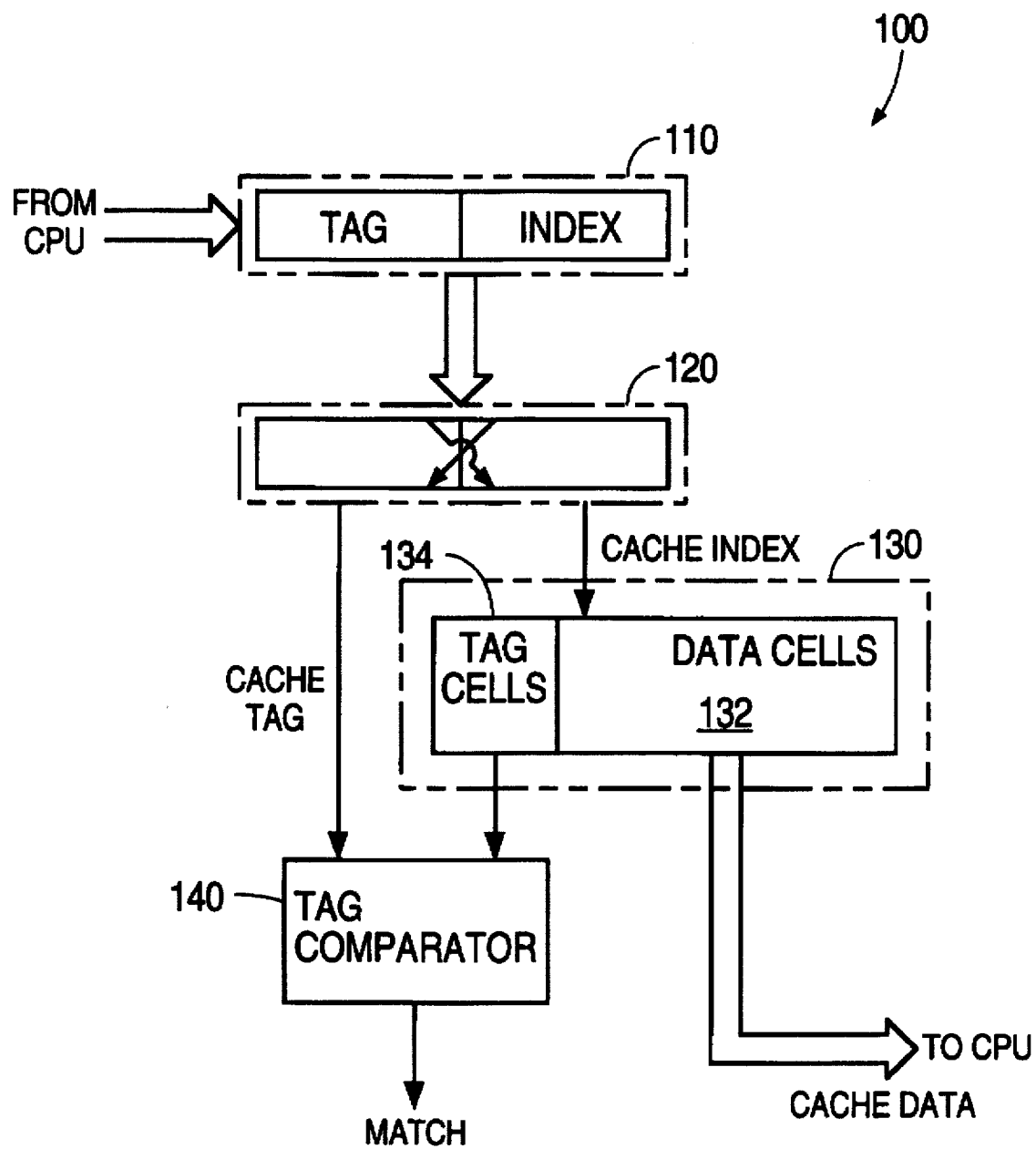
FIG. 2 shows a block diagram of a direct mapped cache memory according to one embodiment of the present invention.

FIG. 2 shows a block diagram of a direct mapped cache memory according to one embodiment of the present invention. Cache memory 100 uses a physical address latch 110 to receive a physical address from the CPU. The physical address is divided into a tag portion and an index portion. Physical address latch 110 stores the address received from the CPU and sends the address to a multiplexing circuit 120, which exchanges a physical address tag bit with a physical address index bit to generate the cache address to access a cache RAM 130.

The cache index from multiplexing circuit 120 accesses data cells 132 in cache RAM 130 to output the data word, which also accesses the stored tag for that particular data word from tag cells 134. The data word is sent to the CPU, while a tag comparator 140 compares the cache tag from multiplexing circuit 120 with the stored tag from cache RAM 130. If the tags match, the stored data word corresponds to the address requested by the CPU and the CPU accepts the data word.

Figure 1:
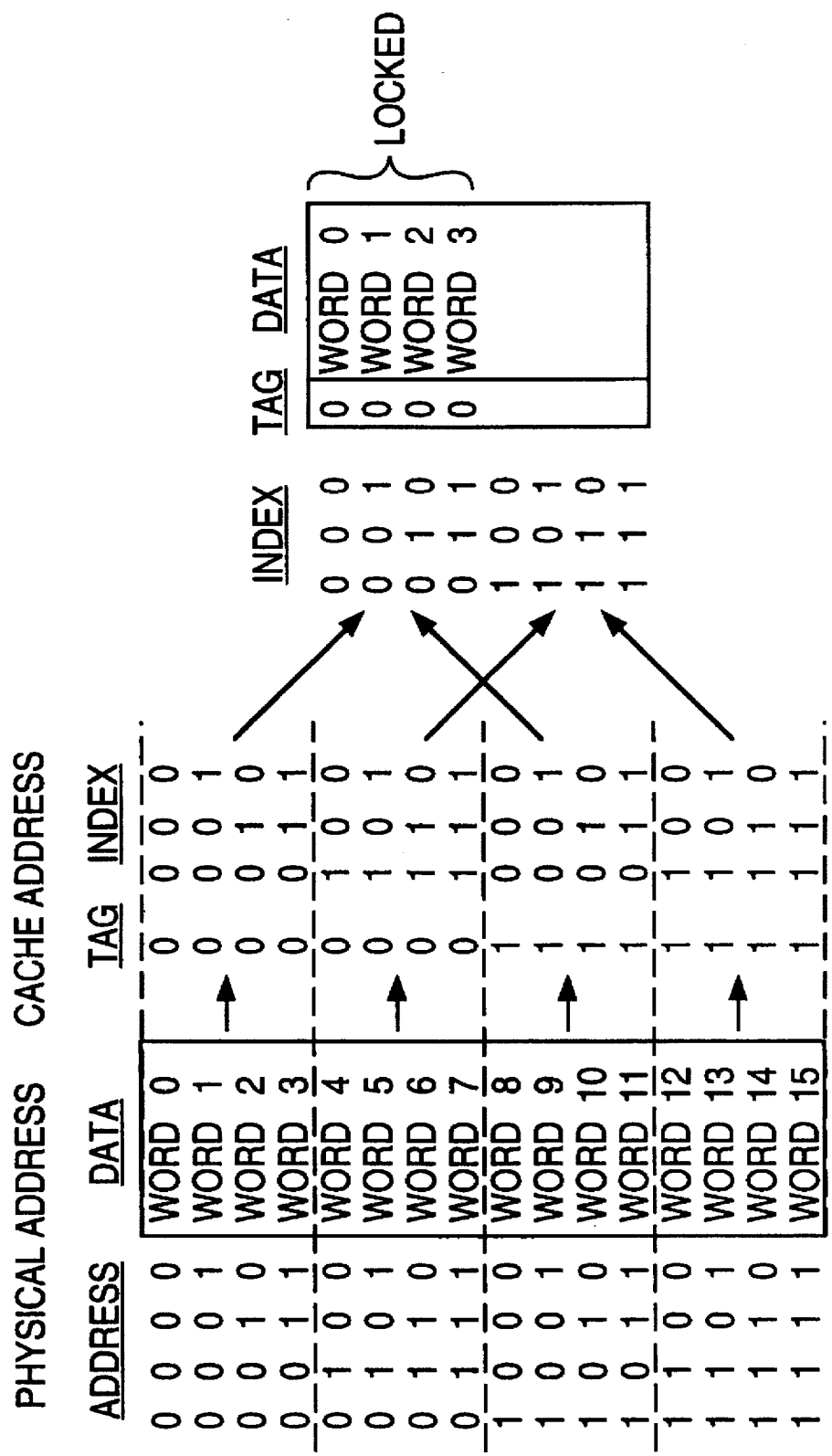
FIG. 1 shows a prior art memory map of a 16 word main memory and an 8 word direct mapped cache memory.
Figure 3:
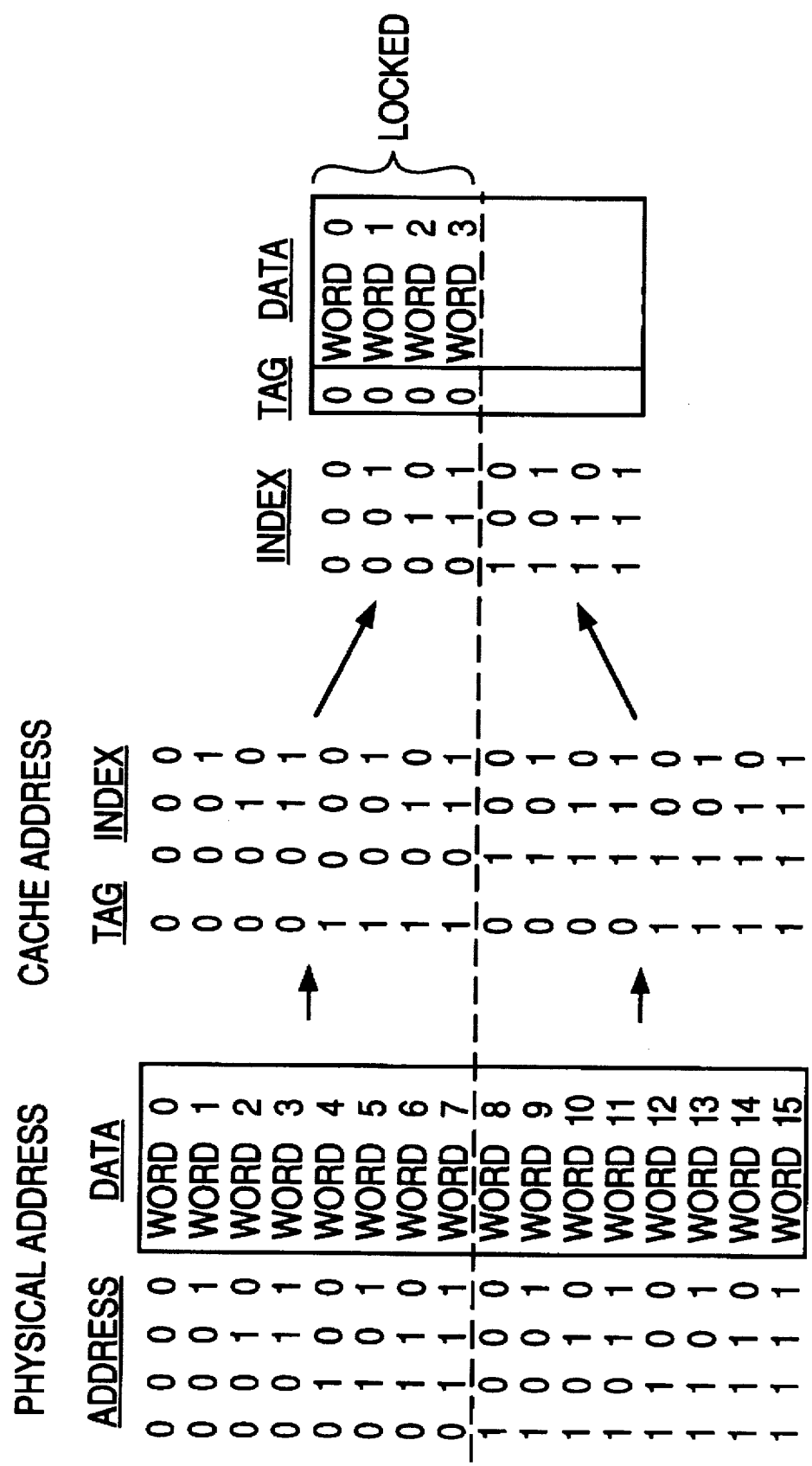
FIG. 3 shows a memory map of 16 word main memory and an 8 word direct mapped cache according to the present invention.

FIG. 3 shows a memory map of an 8 word direct mapped cache according to the present invention. Physical address range 0000–0111 maps into cache index range 000–011, whereas physical address range 1000–1111 maps into cache index range 100–111. As a result, a programmer can lock a 4 word program stored at physical address range 0000–0011 in the lower-order half of the cache RAM and keep the upper-order half of the cache RAM available to cache an 8 word program stored at physical address range 1000–1111. Using this embodiment, the programmer does not have to separate the 8 word program into two discontiguous 4 word portions as required by the mapping of FIG. 1.

The programmer can treat this embodiment as a cache RAM divided into 2 equal portions, each portion servicing a contiguous half of the physical address range. Thus, the programmer can store in the lower-order half of the physical address range programs to be locked in the cache RAM, while storing other programs contiguously in the upper-order of the physical address range, which are serviced by the upper-order portion of the cache RAM. Thus, this embodiment realizes a "lockable" direct mapped cache without TLBs, additional sets of tag comparators, or additional page management or operating system software.

Figure 4:
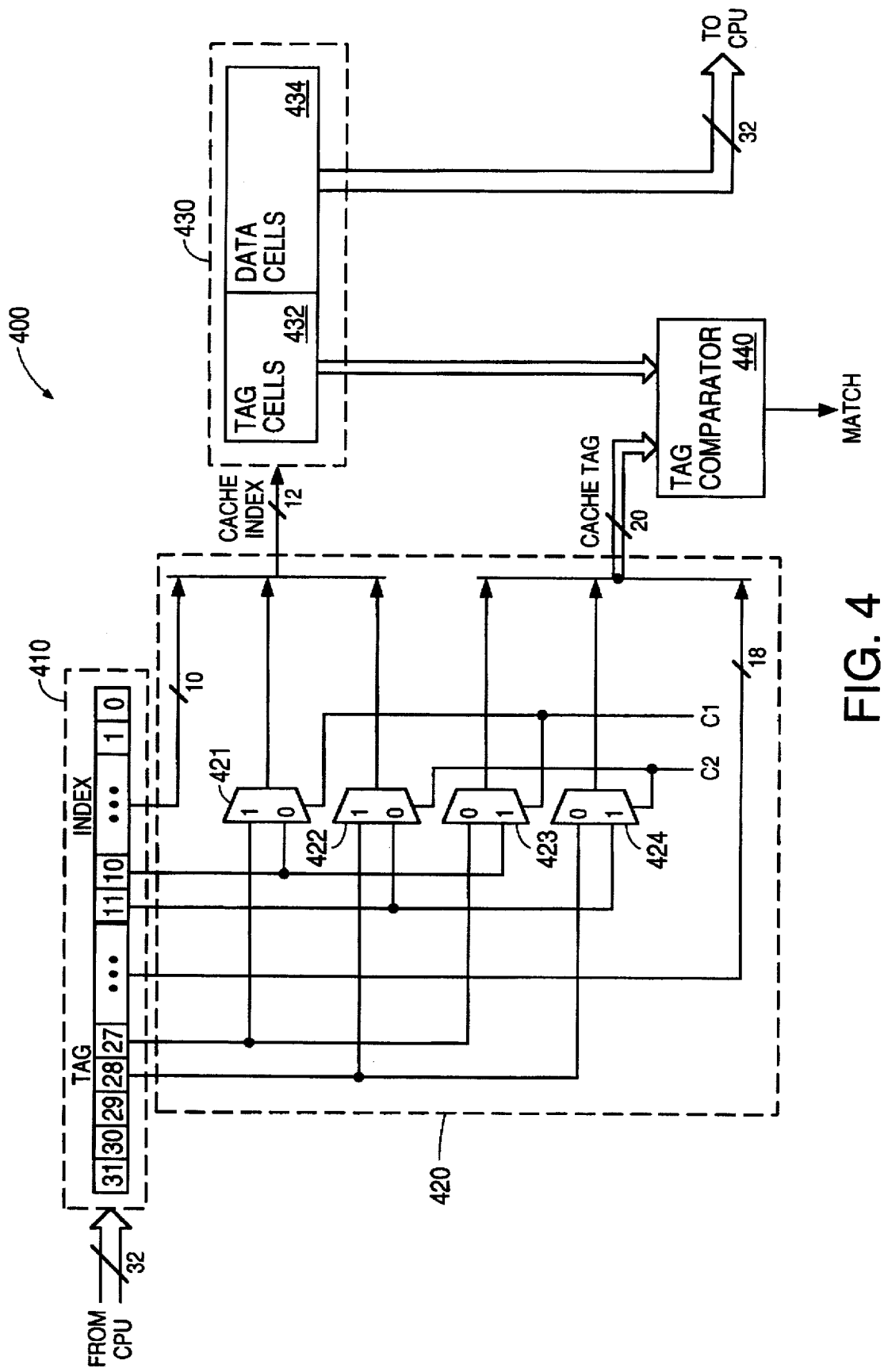
FIG. 4 shows a block diagram of a direct mapped instruction cache memory according to another embodiment of the present invention.

FIG. 4 shows a block diagram of a direct mapped instruction cache memory according to another embodiment of the present invention. Cache memory 400 is a 4 kB instruction cache that services a 512 MB main memory. The CPU uses 32 bit addresses for accessing the main memory, with a 20 bit tag and 12 bit index. Bits 0–11 form the physical address index and bits 12–31 form the physical address tag. A physical address latch 410 receives the physical address from the CPU and sends the received address to a multiplexing circuit 420.

Multiplexing circuit 420 includes multiplexers 421–424. Control signal C1 selects the output of multiplexers 421 and 423. When control signal C1 is a logic zero, multiplexers 421 and 423 do not exchange bit 10 for bit 27 in outputting the cache index and cache tag, respectively. However, when control signal C1 is a logic one, multiplexers 421 and 423 exchange bit 10 for bit 27 in outputting the cache index and cache tag, respectively.

Similarly, control signal C2 controls multiplexers 422 and 424 to exchange or not exchange bits 11 and 28 in generating the cache index and cache tag, respectively. Control signals C1 and C2 can be provided by register, PROM, or other memory cells (not shown) to configure the cache as desired.

When control signals C1 and C2 are both logic zero, no bits are exchanged, and, consequently, cache memory 400 operates as a traditional direct mapped cache.

Figure 5:
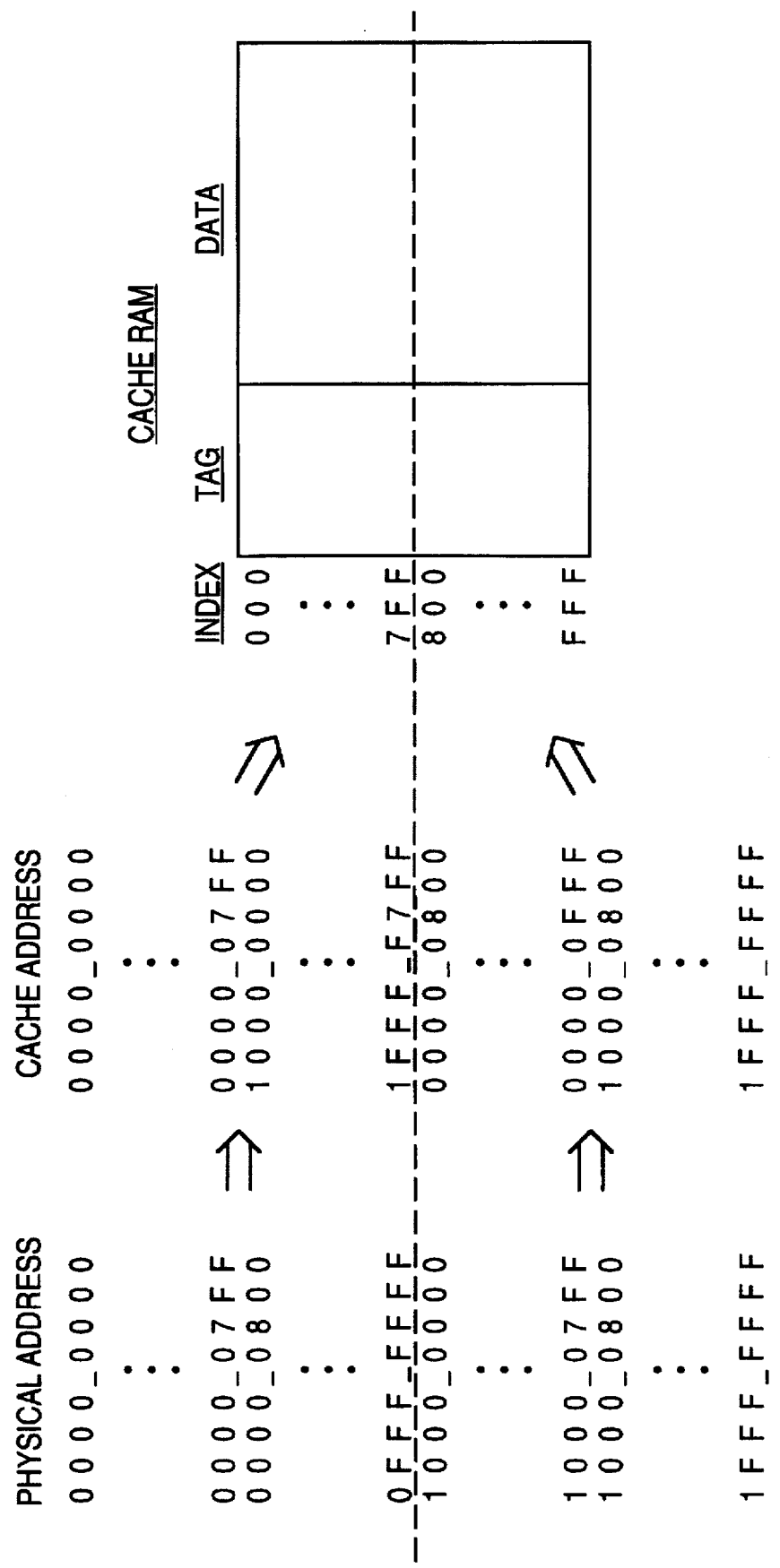
FIG. 5 shows a memory map of the cache memory of FIG. 4 when bits 28 and 11 are exchanged.

When control signals C1 and C2 are a logic zero and logic one, respectively, only bits 28 and 11 are exchanged. FIG. 5 shows a memory map of the cache memory of FIG. 4 when bits 28 and 11 are exchanged. Physical address range 0000_0000–0FFF_FFFF (Hex) is mapped into cache address 0000_0000_0000_07FF and 1000_0000–1FFF_F7FF. Likewise, physical address range 1000_0000–1FFF_FFFF is mapped into cache address 0000_0800_0000_0FFF and 1000_0800–1FFF_FFFF. As a result, 256 MB physical address range 0000_0000–0FFF_FFFF is serviced by cache index range 000–7FF, whereas 256 MB physical address range 1000_0000–1FFF_FFFF is serviced by cache index range 800–FFF. Thus, in a manner similar to cache memory 200 (FIG. 2), cache RAM 430 is now divided into two 2 kB portions, each servicing a contiguous 256 MB portion of the 512 MB physical address range.

The user can advantageously use this configuration to store up to 2 kB of critical programs in the upper 256 MB of the physical address range and lock them in the upper 2 kB portion of cache RAM 430 and, moreover, store other non-critical programs in the lower 256 MB contiguous physical address range serviced by the lower 2 kB portion of cache RAM 430. Because 256 MB is large enough to store several typical programs, the user can store each non-critical program contiguously and still have each non-critical program completely serviced by the cache without TLBs or additional page management and operating system software. Because each software program is contiguous, software compilers and linkers easily support this cache locking configuration.

Figure 6:
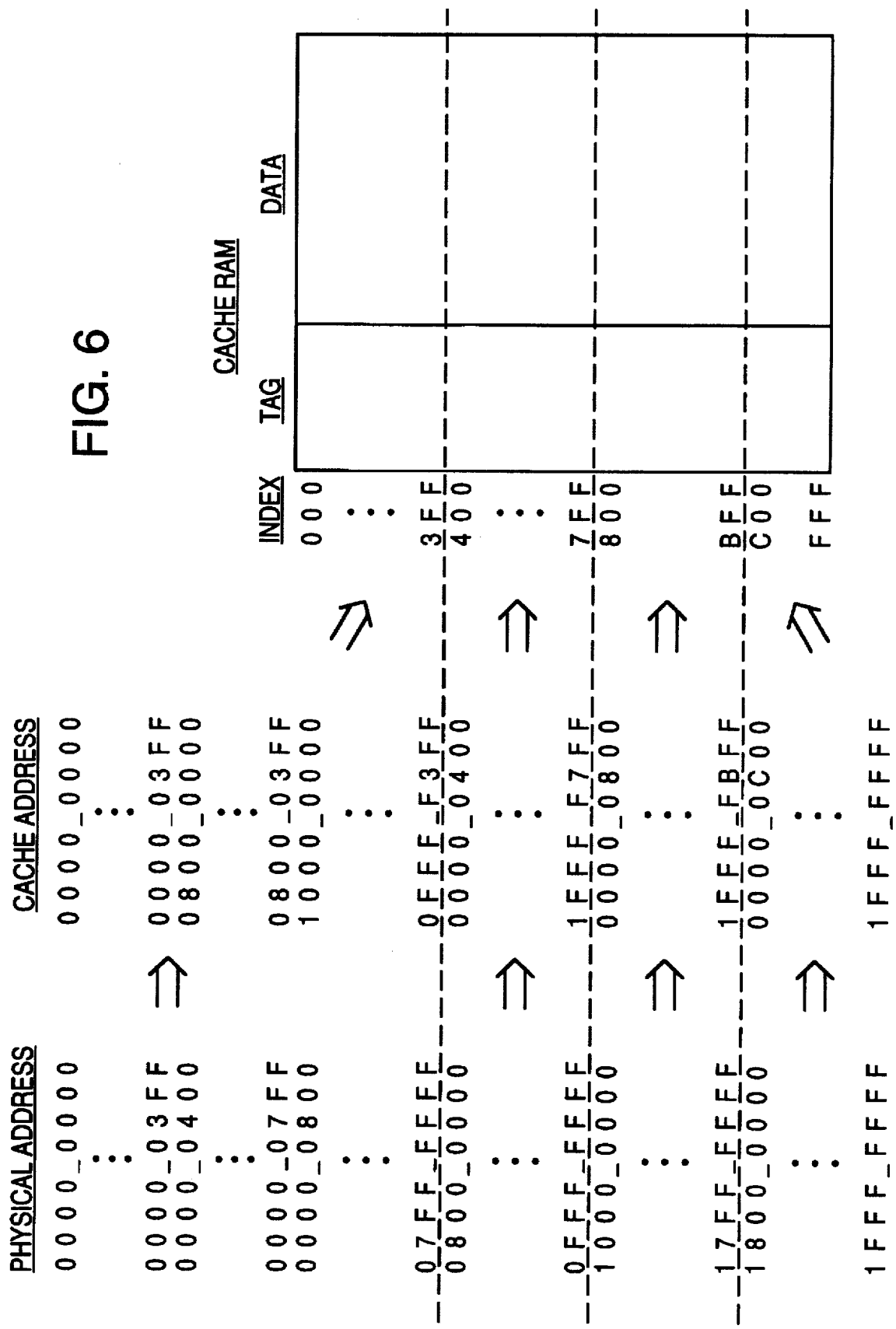
FIG. 6 shows a memory map of the cache memory of FIG. 4 when bits 28 and 11, and 27 and 10 are exchanged, respectively.

When control signals C1 and C2 are both logic one, bit 28 is exchanged with bit 11, and bit 27 is exchanged with bit 10. FIG. 6 shows a memory map of the cache memory of FIG. 4 when bits 28 and 11, and 27 and 10 are exchanged, respectively. Similar to the mapping described above in conjunction with FIG. 5, physical address range 0000_0000–07FF_FFFF (Hex) is mapped into cache index range 000–3FF. Physical address range 0800_0000–0FFF_FFFF is mapped into cache index range 400–7FF. Physical address range 1000_0000–17FF_FFFF is mapped into cache index range 800–BFF. Physical address range 1800_0000–1FFF_FFFF is mapped into cache index range C00–FFF. Thus, cache RAM 430 is now divided into four 1 kB portions, each servicing a contiguous 128 MB portion of the 512 MB physical address range.

The user can use this configuration to lock critical programs into one or more of the four 1 kB cache portions, while using the remaining 1 kB cache portions to service non-critical programs stored in the physical address ranges corresponding to the remaining 1 kB cache portions. For example, the user can store a 256 byte program at physical address range 0000_0000–0000_03FF and lock it into the cache at index range 000–3FF. As a result, the user can store other programs contiguously at 384 MB address range 0800_0000–1FFF_FFFF, which is serviced by cache index range 400–FFF.

Table 1 shows the mapping of cache memory 400 in response to control signals C1 and C2 in tabular form. In a preferred embodiment, control signals C1 and C2 are software reconfigurable by writing to a designated control register (not shown).

TABLE 1

| C1 | C2 | physical memory range | cache index range |
|----|----|-----------------------|-------------------|
| 0  | 0  | 0000_0000–1FFF_FFFF   | 000–FFF           |
| 0  | 1  | 0000_0000–0FFF_FFFF   | 000–7FF           |
|    |    | 1000_0000–1FFF_FFFF   | 800–FFF           |
| 1  | 1  | 0000_0000–07FF_FFFF   | 000–3FF           |
|    |    | 0800_0000–0FFF_FFFF   | 400–7FF           |
|    |    | 1000_0000–17FF_FFFF   | 800–BFF           |
|    |    | 1800_0000–1FFF_FFFF   | C00–FFF           |

Figure 7:
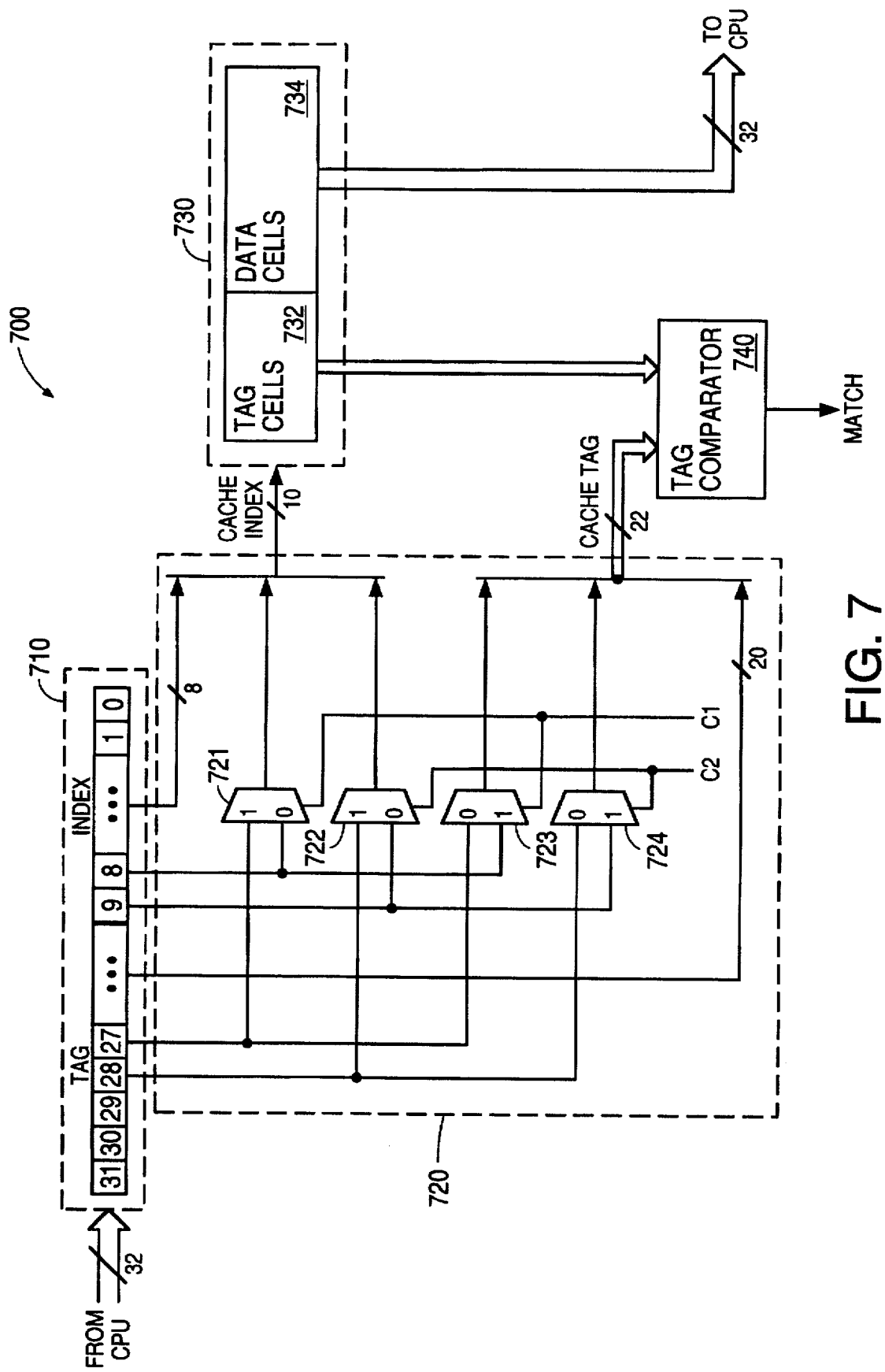
FIG. 7 shows a block diagram of a direct mapped data cache memory according to another embodiment of the present invention.

FIG. 7 shows a block diagram of a direct mapped data cache memory according to another embodiment of the present invention. Cache memory 700 is a 1 kB data cache and services a 512 MB main memory. The CPU uses 32 bit addresses for accessing the main memory, with a 22 bit tag and 10 bit index. Bits 0–9 form the physical address index, thereby fully addressing the 1 kB data cache RAM, and bits 10–31 form the physical address tag. A physical address latch 710 receives the physical address from the CPU and sends the received address to a multiplexing circuit 720.

In a manner similar to multiplexing circuit 420 (FIG. 4), multiplexers 721–724 in multiplexing circuit 720 operate in response to control signals C1 and C2 to exchange or not exchange bit 28 for bit 9, and bit 27 for bit 8. Table 2 shows the mapping of cache memory 700 in response to control signals C1 and C2.

TABLE 2

| C1 | C2 | physical memory range | cache index range |
|----|----|-----------------------|-------------------|
| 0  | 0  | 0000_0000–1FFF_FFFF   | 000–3FF           |
| 0  | 1  | 0000_0000–0FFF_FFFF   | 000–1FF           |
|    |    | 1000_0000–1FFF_FFFF   | 200–3FF           |
| 1  | 1  | 0000_0000–07FF_FFFF   | 000–0FF           |
|    |    | 0800_0000–0FFF_FFFF   | 100–1FF           |
|    |    | 1000_0000–17FF_FFFF   | 200–2FF           |
|    |    | 1800_0000–1FFF_FFFF   | 300–3FF           |

The foregoing has described the principles and preferred embodiments of the present invention.

However, the invention should not be construed as being limited to the particular embodiments described herein.

For example, different implementations may be used for multiplexing circuits 420 and 720. Further, different bits from the physical address latch may be exchanged as appropriate for the size of the cache RAM, or different bits may be exchanged to provide variable sizes of contiguous address spaces. Still further, 3 (or more) bits from the physical address index may be exchanged with 3 (or more) from the physical address tag to divide the cache RAM into 8 (or 16, etc.) portions, as supported by the size of the RAM cache.

In other embodiments, a virtual address latch may be substituted for the physical address latch for use in "virtually tagged cache" applications as opposed to the "physically tagged cache" applications described for the embodiments above. Thus, the above-described embodiments should be regarded as illustrative rather than restrictive. Variations can be made to those embodiments by workers skilled in the art without departing from the scope of the present invention as defined by the following claims.

We claim:

1. A direct mapped cache memory for servicing an address space, said cache memory comprising:

a memory for storing a data word and a tag at a cache index address in said memory;

an address latch for receiving an address signal corresponding to an address in said address space, said address signal including an address tag signal and an address index signal;

a multiplexer circuit, coupled to said memory and said address latch, for receiving a first component signal from said address tag signal and a second component signal from said address index signal and selectably exchanging said first component signal with said second component signal in response to a first control signal to form a cache tag signal that includes said second component signal and a cache index signal that includes said first component signal, whereby said cache index signal accesses a corresponding cache index address and causes said memory to generate a stored data signal and stored cache tag signal corresponding to said data word and said tag stored at said corresponding cache index address; and a tag comparator, coupled to said address latch and said memory, for comparing said cache tag signal with said stored cache tag signal.

2. The cache memory recited in claim 1, wherein when said first control signal is at a first logic state, said address index signal equals said cache index signal.

3. The cache memory recited in claim 2, wherein, when said first control signal is at a second logic state:
- said address space comprises a first address range and a second address range, said first and second address ranges being contiguous and nonoverlapping; and
- said memory comprises first and second portions, said first and second portions being contiguous and nonoverlapping, wherein said first portion services said first address range and said second portion services said second address range.

4. The cache memory recited in claim 3, wherein a data word stored at an address in said first address range is selectably locked in said first portion of said memory.

5. The cache memory recited in claim 1, wherein said multiplexer circuit further selectably exchanges a third component signal from said address tag signal with a fourth component signal from said address index signal in response to a second control signal, wherein said cache index signal further includes said third component signal, and said cache tag signal further includes said fourth component signal.

6. The cache memory recited in claim 5, wherein when said first and second control signals are both at a first logic state, said address index signal equals said cache index signal.

7. The cache memory recited in claim 6, wherein, when said first control signal is at a second logic level and said second control signal is at said first logic level:
- said address space comprises a first address range and a second address range, said first and second address ranges being contiguous and nonoverlapping;
- said memory comprises first and second portions, said first and second portions being contiguous and nonoverlapping; and
- said first portion services said first address range and said second portion services said second address range.

8. The cache memory recited in claim 7, wherein, when said first and second control signals are at said second logic state:
- said address space comprises third, fourth, fifth and sixth address ranges, said third, fourth, fifth, and sixth address ranges being contiguous and non-overlapping;
- said memory comprises third, fourth, fifth and sixth portions, said third, fourth, fifth and sixth portions being contiguous and nonoverlapping; and
- said third portion services said third address range, said fourth portion services said fourth address range, said fifth portion services said fifth address range, and said sixth portion services said sixth address range.

9. The cache memory recited in claim 8, wherein a first data word stored at an address in said third address range is selectably locked in said third portion of said memory.

10. The cache memory recited in claim 9, wherein a second data word stored at an address in said fourth address range is selectably locked in said fourth portion of said memory.

11. The cache memory recited in claim 1, wherein said memory comprises a RAM.

12. A method for implementing a direct mapped cache memory for servicing an address space, said cache memory comprising a memory, said method comprising the steps of:
- receiving an address signal from a CPU, said address signal including an address tag signal and an address index signal;
- exchanging a first component signal of said address tag signal with a second component signal of said address index signal;
- providing a cache index signal that includes said first component signal;
- providing a cache tag signal that includes said second component signal;
- accessing a cache index address of said memory with said cache index signal to provide a data word signal and a stored tag signal corresponding to a data word and tag stored in said memory at said cache index address; and
- comparing said cache tag signal with said stored tag signal and generating a match signal when said cache tag signal and said stored tag signal match.

13. The method recited in claim 12, wherein said cache index signal further includes a third component signal of said address index signal.

14. The method recited in claim 13, wherein said cache tag signal further includes a fourth component signal of said address tag signal.

15. The method recited in claim 14, further comprising the step of exchanging a fifth component signal of said address tag signal with a sixth component signal of said address index signal, said cache index signal further including said fifth component signal, said cache tag signal further including said sixth component signal.

16. A direct mapped cache memory, for servicing an address space, said cache memory comprising:
- a memory;
- receiving means for receiving an address signal from a CPU, said address signal including an address tag signal and an address index signal;
- exchanging means, coupled to said receiving means, for exchanging a first component signal of said address tag signal with a second component signal of said address index signal;
- cache index means, coupled to said exchanging means, for providing a cache index signal that includes said first component signal;
- cache tag means, coupled to said exchanging means, for providing a cache tag signal that includes said second component signal;
- accessing means, coupled to said cache index means and said memory, for accessing a cache index address of said memory with said cache index signal to provide a data word signal and a stored tag signal corresponding to a data word and tag stored in said memory at said cache index address; and
- comparing means, coupled to said cache tag means and said memory, for comparing said cache tag signal with said stored tag signal and generating a match signal when said cache tag signal and said stored tag signal match.

17. The cache memory recited in claim 16, wherein said cache index signal further includes a third component signal of said address index signal.

18. The cache memory recited in claim 17, wherein said cache tag signal further includes a fourth component signal of said address tag signal.

19. The cache memory recited in claim 18, wherein said exchanging means exchanges a fifth component signal of said address tag signal with a sixth component signal of said address index signal, whereby said cache index signal includes said fifth component signal and said cache tag signal further includes said sixth component signal.

20. The cache memory recited in claim 16, wherein said memory comprises a RAM.

* * * * *